E. NORTON.
TOP FOR TIN CANS.
APPLICATION FILED OCT. 5, 1907.
933,103.
Patented Sept. 7, 1909.
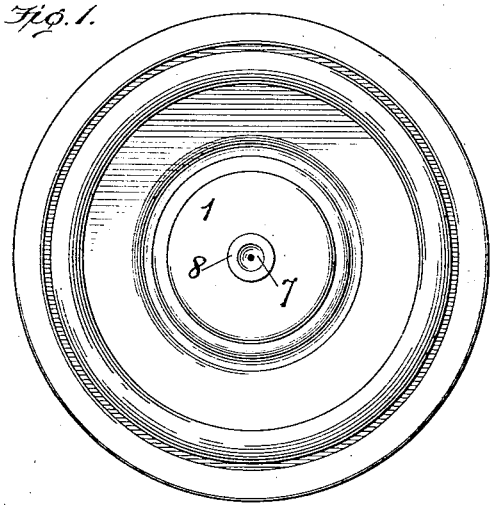
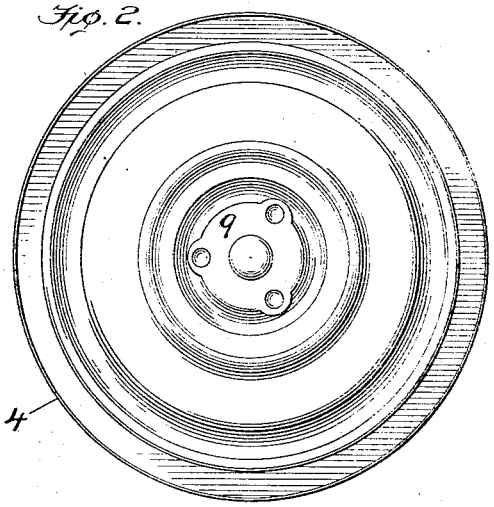
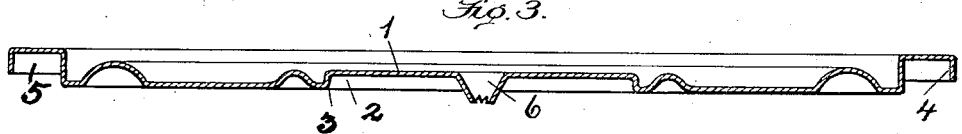
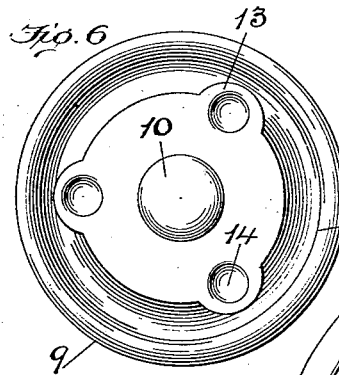
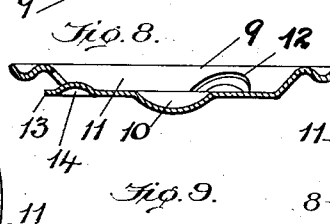
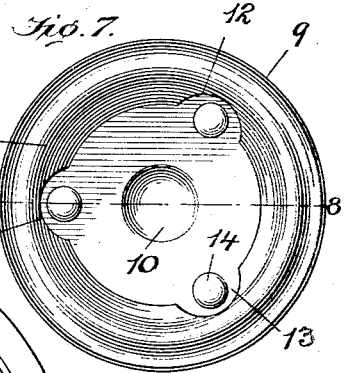
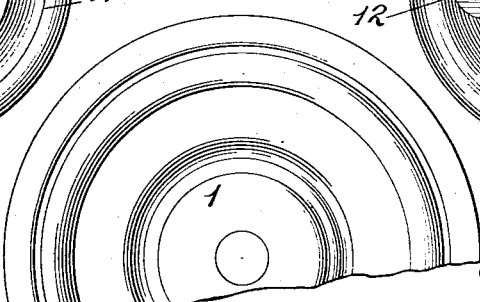

UNITED STATES PATENT OFFICE.

EDWIN NORTON, OF NEW YORK, N. Y.

TOP FOR TIN CANS.

933,103.

Specification of Letters Patent. Patented Sept. 7, 1909.

Application filed October 5, 1907. Serial No. 396,012.

*To all whom it may concern:*

Be it known that I, EDWIN NORTON, a citizen of the United States, residing at New York city, in the county of New York and State of New York, have invented certain new and useful Improvements in Tops for Tin Cans, of which the following is a specification.

This invention relates to an improved top for tin cans.

The object of the invention is to provide a can-top with certain improved and desirable features, as an article of manufacture and sale, ready to be applied to an unclosed can that has been filled with some alimentary article and is in readiness to be hermetically sealed in vacuum.

The can-top of this invention employs no cap but is a complete cover in one piece, and is intended as a closure for that class of tin cans known as the open-top lock-seam can, which either has no solder at all in the said lock-seam, or whatever solder may be used is applied to the seam on the outside.

The improved can-top which constitutes the subject-matter of the present invention, comprises a stamped tin-plate cover, without any opening except what is known as the "vent-hole," having three features, first, an outer double-seaming flange which is adapted to be united with a can-body by interlocking with an outward-turned flange laid off on the upper end of a can-body; said stamped-up cover also has, second, an ordinary vent-hole which however is provided with a pierced disk of solder which latter is exposed on the upper side of the top in such position that the vent-hole through the tin-plate top and the pierced aperture through the said disk of solder will be coincident, and together constitute one vent opening; and said cover also has, third, at its under side and below said vent opening, a vent-protector secured directly and permanently to the said cover or top without employing solder.

In the accompanying drawing which illustrates the invention—Figure 1 shows the upper surface of a can-top provided with a small disk of solder that has an aperture forming the vent; this view shows the appearance of the completed can-top. Fig. 2 shows the under side or lower surface of the same can-top provided with a vent-protecting disk; this view also shows the completed can-top. Fig. 3 is a diametrical section of the one-piece can-top showing the formation of vent hole in the tin-plate. Fig. 4 is a like section of the can-top but also shows the pierced solder disk in position at the vent. Fig. 5 is a diametrical section of the can-top having both the pierced solder disk at the vent, and the vent-protector below said vent. This figure shows the can-top in its completed condition as an article ready for use or sale to packers of canned goods. Fig. 6 is a bottom plan view of the vent-protecting disk, separated from the can-top. Fig. 7 is a top view of the vent-protecting disk. Fig. 8 is a cross-section of same. Fig. 9 shows the appearance of the upper surface of a can-top after the solder disk has been fused to close the vent.

The can-top does not require the ordinary "cap," as it has no filling opening; the raised central circular part, 1, is integral with the rest of the top and the whole top comprises one piece; the slightly-raised circular formation on the upper surface produces a cavity, 2, on the lower surface, said cavity being bounded by a ring-shaped ridge or wall, 3, see Fig. 3. The can-top has around its rim a downward flange, 4, and also an adjoining annular groove, 5, which are adapted to produce, when united with the open-end of a can-body, the well-known interlocking seam or joint. The top also has a downward indentation which latter has an open vent-hole, 6, and a suitable piece of solder is within said indentation but does not close the vent-hole. The solder is so attached that it will retain its position until the time arrives for finally sealing the said vent-hole, 6, at which time the solder will be fused and thereby the vent-hole closed. In the present instance the vent-hole, 6, is provided on its exterior or upper side with a funnel-shaped disk of solder, 7, the funnel part of which fits within said indented vent-hole, 6, while the flat top circular rim, 8, of the solder rests closely down on the upper surface of the can-top. The funnel shaped disk of solder, 7, may be attached to its position by any suitable means, such as by the soft metal of the funnel-shaped part, 7, engaging with the hard metal burs formed at the small part of the indented vent-hole, 6. The point of the funnel-shaped solder disk has an aperture which is coincident with the vent-hole in the tin-plate and thus the air that may be exhausted from the can at the time the hermetically sealing process is going on, escapes through the aperture in the solder just previous to the said solder being fused to close the said vent-hole. The exhaust of the air and the fusing of the solder to close the vent hole are effected in vacuum.

It may be remarked that in practice the vent-hole, 6, is quite small, a very small aperture being sufficient for the escape of the hot expanded air or pent-up gases under pressure. In can vents of this character experience has long since demonstrated that the fused solder will immediately close and fill the small vent and remain therein and at once congeal.

A vent-hole protector, 9, is provided and secured permanently without the use of solder to the under side of the can-top and wholly within the marginal rim-edge. One object of this protector is to prevent the food contents of the filled can, during the process of exhausting air from said can in the vacuum machine from closing the vent hole. It is well-known that in processing certain alimentary substances, such for instance as meats and salmon and other fish, which swell or expand, there is great liability of the said substances closing the vent hole through which the air is to be exhausted, especially when a vacuum is produced in the can by mechanical means. Various contrivances have been suggested and tried for this purpose but the devices referred to have either required solder for their attachment which is objectionable, or said devices have had prongs or tangs which were secured to the rim of an ordinary cap, or said tangs were secured at the end-seam which fastened the top of the can to the body of the can, said constructions proving an interference with the desired closeness of fit of said seam parts, and for these and other reasons said devices have been found objectionable.

Another object of the vent-hole protector is to prevent injury or contamination of the contents of the can by the said protector receiving any particles of solder or flux that are on the outside, and used to seal the vent-hole, and which when the fusing takes place may possibly pass from the outside through the vent-hole to the interior.

The vent-hole protector by my invention is permanently attached to the can-top on its interior or lower side without solder, by the mechanical engagement of the metal of the protector with the metal of the can-top, thereby avoiding the use of solder. Furthermore the said engagement of the metal of these two parts is effected wholly within the marginal rim-edge of the can-top, whereby there is an avoidance of all interference with the seam parts, and therefore leaks at such seams are unlikely.

The manner of effecting the permanent engagement of the vent-protector with the top is shown in Figs. 2 and 5 of the drawing. The vent-protector, 9, preferably has a circular form and size adapted to snugly fit within the ring-shaped ridge or bead, 3, on the lower surface of the top. By suitable dies that part of the metal of the top which forms the ring-shaped ridge or bead is contracted so as to closely surround the rim of the protector, 9, and hold the latter in permanent engagement. As the vent-protector is engaged with the can-top wholly within the circular rim-edge of the latter, the said protector will not interfere in any way with the formation of any seam which is necessary in uniting the said can-top to the can-body. The protector, in the present instance, has in its bottom a central depression, 10, which has position immediately below the vent-hole in the top; this depression will receive and hold any solder or flux that may happen to enter through the vent-hole at the time the solder is fused to seal said hole. Thus the protector serves the purpose of preventing the substance within the can from becoming contaminated by either solder or flux which may enter at the vent hole. The protector is provided in its wall, 11, adjacent the circular rim, the several vent slits, 12, each slit being formed by breaking a round-pointed tang, 13, from the said wall of the protector; the tangs are flattened so as to be in the same plane as the bottom of the protector. In the present instance there are three slits and three tangs; the round point of each tang, 13, projects and conceals the slit, and thereby the tangs serve to prevent the substance in the can from clogging or closing the said vent slits when subjected to the action of a vacuum machine. An indentation, 14, is made in each tang for the purpose of stiffening the metal composing the tang, and thereby prevent the tang from being bent in a way that might close the slit which the tang protects.

It will be understood that in the process of exhausting the air from the can, by means of a vacuum receiver and pump, the air that may be in the can will pass through one or more of the vent slits, 12, in the protector, and then through the vent-hole in the top; when the air has been exhausted and while the can is in the vacuum receiver the solder, 7, will be fused to seal the vent-hole. The protector forms an air-space between the top and the protector-plate and incidentally serves another useful purpose, namely, to prevent the heat of the soldering iron, which is applied on the exterior to fuse the solder for closing the vent-hole, from reaching and injuring delicate substances, such as butter with which the can may be filled.

This improved top is adapted especially for cans in which the vacuum process is used in exhausting and sealing, whether the cans contain food, tobacco, paints or other substances.

The feature of a can-top provided with an indentation which has an open vent-hole, and a suitable piece of solder within said indentation but leaving the vent-hole open, and the solder temporarily attached, in order that any air that may be in a can which has been closed by said top may escape, so that a hot iron for "tipping" may be applied to fuse said piece of solder, and cause it to seal the vent hole, is believed to be new whether applied to a one-piece can-top, or applied to the familiar cap used to close the filling opening in a can-top. Such of the appended claims, therefore as relate to this particular feature are meant to cover the same whether applied to a one-piece top for cans or to a cap for closing the filling opening in can-tops.

Having thus described my invention what I claim is,

1. A tin-plate disk for closing cans having an indented vent-hole, and a funnel-shaped disk of solder corresponding in shape with said indented hole and fitted therein and said solder disk having an aperture.

2. As an article of manufacture, a can-top having a marginal edge-flange for engaging the walls of a can-body, and provided with a vent-hole to relieve the internal pressure of a can; and a vent-hole protector plate which is below the said can-top and with a space between and is secured thereto by interlocking the metal of the protector plate and can-top wholly within the marginal edges of the latter.

3. As an article of manufacture, a disk for closing a can and having a central vent-hole and a ring-shaped bead on the lower surface and concentric with said vent-hole and intermediate of the vent-hole and disk-rim, and a vent-hole protector plate having its edge interlocked with the said ring-shaped bead of the disk.

4. As an article of manufacture, a tin-can closure having a vent-hole with a bead concentric around said vent-hole; a vent-hole protector plate at the under side of said closure and below its vent-hole, and the edge of the protector plate interlocked with the said concentric bead of the closure, and forming an air-space between the closure and said protector plate and the latter having in its circumferential rim a plurality of vent openings.

5. As an article of manufacture, a can-top having a marginal flange for engaging the wall of a can-body and provided with a central vent-hole; solder attached to the exterior of the can-top adjacent said vent-hole and so adapted thereto that when fused it will flow into and seal said vent-hole; and a circular plate having a circumferential wall provided with a vent passage and secured to the can-top below the vent-hole therein by its circular edge permanently interlocking with the metal of the top wholly within the said marginal flange.

6. A tin-plate disk for closing cans having a vent-hole, and a plate permanently secured to the lower surface of the disk to protect said vent-hole, said plate having a flat surface provided at its center with a depression below said flat surface.

7. A tin-plate disk for closing cans having a vent-hole and a circular plate secured to said disk below its vent-hole and having a circumferential wall with a vent-opening therein and a tang projecting over the said vent-opening.

8. A tin-plate disk for closing cans having a vent-hole and a circular plate secured to said disk below its vent-hole and having a circumferential wall with a vent-opening therein and a tang projecting over the said vent-opening and provided with an indentation.

In testimony whereof I affix my signature in presence of two witnesses.

EDWIN NORTON.

Witnesses:
FREDERICK A. ISHAM,
E. D. VIALL.